(12) United States Patent
Tanaka et al.

(10) Patent No.: US 11,085,677 B2
(45) Date of Patent: Aug. 10, 2021

(54) REFRIGERANT RECOVERY DEVICE AND REFRIGERANT RECOVERY METHOD

(71) Applicant: DAIKIN INDUSTRIES, LTD., Osaka (JP)

(72) Inventors: Masaru Tanaka, Osaka (JP);
Shigeharu Taira, Osaka (JP);
Tomoyuki Haikawa, Osaka (JP);
Yoshiki Shimizu, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 68 days.

(21) Appl. No.: 16/073,523

(22) PCT Filed: Jan. 26, 2017

(86) PCT No.: PCT/JP2017/002758
§ 371 (c)(1),
(2) Date: Jul. 27, 2018

(87) PCT Pub. No.: WO2017/131095
PCT Pub. Date: Aug. 3, 2017

(65) Prior Publication Data
US 2019/0032976 A1 Jan. 31, 2019

(30) Foreign Application Priority Data
Jan. 28, 2016 (JP) .............................. JP2016-014468

(51) Int. Cl.
*F25B 45/00* (2006.01)
*F25B 1/00* (2006.01)
(Continued)

(52) U.S. Cl.
CPC ............. *F25B 45/00* (2013.01); *C09K 5/045* (2013.01); *C09K 15/18* (2013.01); *F25B 1/00* (2013.01);
(Continued)

(58) Field of Classification Search
CPC ............................ F25B 45/00; F25B 2345/002
See application file for complete search history.

(56) References Cited

U.S. PATENT DOCUMENTS 4,476,688 A * 10/1984 Goddard ................. F25B 45/00
62/149
6,260,372 B1 * 7/2001 Burke ..................... F25B 45/00
62/292
(Continued)

FOREIGN PATENT DOCUMENTS

JP         2005-249297 A   9/2005
WO    WO 2015/125885 A1   8/2015

OTHER PUBLICATIONS

Extended European Search Report, dated Jul. 26, 2019, for European Application No. 17744325.6.
(Continued)

*Primary Examiner* — Frantz F Jules
*Assistant Examiner* — Lionel Nouketcha
(74) *Attorney, Agent, or Firm* — Birch, Stewart, Kolasch & Birch, LLP (57) ABSTRACT

A refrigerant recovery system is equipped with an extraction pipe, a stabilizer holding container, a recovery pipe, a recovery container, and a recovery device. The extraction pipe is connectable to a refrigerant extraction port of an air conditioning apparatus. The stabilizer holding container is connected to the extraction pipe—and holds a stabilizer. The stabilizer holding container causes refrigerant guided by the extraction pipe to come into contact with the stabilizer. The recovery pipe guides the refrigerant discharged from the stabilizer holding container. The recovery container is connected to the recovery pipe and recovers the refrigerant guided by the recovery pipe. The recovery device causes the refrigerant to move from the refrigerant extraction port to the recovery container. The refrigerant includes a compound (Continued)

represented by a molecular formula having one or more carbon-carbon unsaturated bonds.

7 Claims, 3 Drawing Sheets

(51) Int. Cl.
  *C09K 15/18* (2006.01)
  *C09K 5/04* (2006.01)
(52) U.S. Cl.
  CPC .. *C09K 2205/122* (2013.01); *F25B 2345/002* (2013.01)

(56) References Cited

U.S. PATENT DOCUMENTS

| | | | |
|---|---|---|---|
| 2009/0241560 A1* | 10/2009 | Murray | B60H 1/00585 62/77 |
| 2009/0283712 A1* | 11/2009 | Zyhowski | C07C 17/42 252/68 |
| 2013/0312446 A1* | 11/2013 | Shibanuma | F25B 9/006 62/272 |
| 2014/0033742 A1* | 2/2014 | Esch | B60H 1/00585 62/77 |
| 2014/0070132 A1* | 3/2014 | Fukushima | F25B 9/002 252/67 |
| 2015/0135745 A1 | 5/2015 | Nappa et al. | |
| 2016/0347980 A1 | 12/2016 | Okamoto | |

OTHER PUBLICATIONS

International Search Report, issued in PCT/JP2017/002758, PCT/ISA/210, dated Apr. 18, 2017.

Written Opinion of the International Searching Authority, issued in PCT/JP2017/002758, PCT/ISA/237, dated Apr. 18, 2017.

International Preliminary Report on Patentability and the Written Opinion of the International Searching Authority (Forms PCT/IB/338, PCT/IB/373 and PCT/ISA/237), dated Aug. 9, 2018, for International Application No. PCT/JP2017/002758.

* cited by examiner

REFRIGERANT RECOVERY DEVICE AND REFRIGERANT RECOVERY METHOD

TECHNICAL FIELD

The present invention relates to a refrigerant recovery device and a refrigerant recovery method.

BACKGROUND ART

In the work of maintaining an air conditioning apparatus, recovery work that causes the refrigerant included in the refrigerant circuit to move to a recovery container is performed. Patent document 1 (JP-A No. 2005-249297) discloses a method of that kind of recovery work.

SUMMARY OF INVENTION

Technical Problem

Refrigerants used in air conditioning apparatus include refrigerants in which it is easy for a self-decomposition reaction called a disproportionation reaction to occur under certain conditions. A disproportionation reaction is a chemical reaction in which two or more molecules of the same type, by reacting with each other for example, form two or more different types of substances. One example of a disproportionation reaction is a polymerization reaction that occurs in HFO1123 refrigerant, which has double bonds in its composition. When such a refrigerant that easily undergoes a disproportionation reaction is recovered to a recovery container, there is the concern that free radicals included in the refrigerant will undergo adiabatic compression and cause an explosion.

It is a problem of the present invention to suppress the occurrence of a disproportionation reaction in the work of recovering refrigerant and lower the risk of an explosion.

Solution to Problem

A refrigerant recovery system pertaining to a first aspect of the invention comprises an extraction pipe, a stabilizer holding container, a recovery pipe, a recovery container, and a recovery device. The extraction pipe is connectable to a refrigerant extraction port of an air conditioning apparatus that has refrigerant. The stabilizer holding container is connected to the extraction pipe and holds a stabilizer. The stabilizer holding container causes the refrigerant guided by the extraction pipe to come into contact with the stabilizer. The recovery pipe guides the refrigerant discharged from the stabilizer holding container. The recovery container is connected to the recovery pipe and recovers the refrigerant guided by the recovery pipe. The recovery device causes the refrigerant to move from the refrigerant extraction port to the recovery container. The refrigerant includes a compound represented by a molecular formula having one or more carbon-carbon unsaturated bonds.

According to this configuration, the refrigerant extracted from the extraction pipe comes into contact with the stabilizer in the stabilizer holding container. Consequently, the occurrence of a disproportionation reaction of the refrigerant is suppressed.

A refrigerant recovery system pertaining to a second aspect of the invention comprises an extraction pipe, a recovery container, and a recovery device. The extraction pipe is connectable to a refrigerant extraction port of an air conditioning apparatus that has refrigerant. The recovery container is connected to the extraction pipe and has a stabilizer holding component that holds a stabilizer. The recovery container causes the refrigerant recovered via the extraction pipe to come into contact with the stabilizer. The recovery device causes the refrigerant to move from the refrigerant extraction port to the recovery container. The refrigerant includes a compound represented by a molecular formula having one or more carbon-carbon unsaturated bonds.

According to this configuration, the refrigerant extracted from the extraction pipe comes into contact with the stabilizer in the recovery container. Consequently, the occurrence of a disproportionation reaction of the refrigerant is suppressed.

A refrigerant recovery system pertaining to a third aspect of the invention is the refrigerant recovery system pertaining to the first aspect or the second aspect, wherein the stabilizer includes at least one of an oxidation resistance improver, a heat resistance improver, and a metal deactivator. The oxidation resistance improver and the heat resistance improver include at least one of N,N'-diphenylphenylenediamine, p-octyldiphenylamine, p,p'-dioctyldiphenylamine, N-phenyl-1-naphthylamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol, and 4,4'-methylenebis(2,6-di-t-butylphenol). The metal deactivator includes at least one of imidazole, benzimidazole, 2-mercaptobenzothiazole, 2,5-dimercaptothiadiazole, salicylidene-propylenediamine, pyrazole, benzotriazole, tolutriazole, 2-methylbenzimidazole, 3,5-dimethylpyrazole, methylenebis-benzotriazole, organic acids or esters thereof, primary, secondary, or tertiary aliphatic amines, amine salts of organic acids or inorganic acids, heterocyclic nitrogen-containing compounds, and amine salts of alkyl acid phosphates or derivatives thereof.

According to this configuration, more specific compositions of the stabilizer are presented.

A refrigerant recovery method pertaining to a fourth aspect of the invention comprises: a step of guiding refrigerant via an extraction pipe from a refrigerant circuit to the outside; a step of causing the refrigerant discharged from the extraction pipe to come into contact with a stabilizer; and a step of holding the refrigerant in a recovery container.

According to this method, the refrigerant discharged from the extraction pipe comes into contact with the stabilizer. Consequently, the occurrence of a disproportionation reaction of the refrigerant is suppressed.

A refrigerant recovery method pertaining to a fifth aspect of the invention is the refrigerant recovery method pertaining to the fifth aspect, wherein the stabilizer includes at least one of an oxidation resistance improver, a heat resistance improver, and a metal deactivator. The oxidation resistance improver and the heat resistance improver include at least one of N,N'-diphenylphenylenediamine, p-octyldiphenylamine, p,p'-dioctyldiphenylamine, N-phenyl-1-naphthylamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol, and 4,4'-methylenebis(2,6-di-t-butylphenol). The metal deactivator includes at least one of imidazole, benzimidazole, 2-mercaptobenzothiazole, 2,5-dimercaptothiadiazole, salicylidene-propylenediamine, pyrazole, benzotriazole, tolutriazole, 2-methylbenzimidazole, 3,5-dimethylpyrazole, methylenebis-benzotriazole, organic acids or esters thereof, primary, secondary, or tertiary aliphatic amines, amine salts of organic acids or inorganic acids, heterocyclic nitrogen-containing compounds, and amine salts of alkyl acid phosphates or derivatives thereof.

According to this configuration, more specific compositions of the stabilizer are presented.

Advantageous Effects of Invention

According to the refrigerant recovery system of the first aspect and the second aspect of the invention, the occurrence of a disproportionation reaction of the refrigerant is suppressed.

According to the refrigerant recovery system pertaining to the third aspect of the invention, more specific compositions of the stabilizer are presented.

According to the refrigerant recovery method pertaining to the fourth aspect of the invention, the occurrence of a disproportionation reaction of the refrigerant is suppressed.

According to the refrigerant recovery method pertaining to the fifth aspect of the invention, more specific compositions of the stabilizer are presented.

DESCRIPTION OF EMBODIMENTS

Embodiments of a refrigerant recovery system pertaining to the invention will be described below using the drawings. It will be noted that specific configurations of an air conditioning apparatus pertaining to the invention are not limited to those in the following embodiments and can be appropriately changed in a range that does not depart from the spirit of the invention.

First Embodiment (1) Target of Maintenance Work

Figure 1:
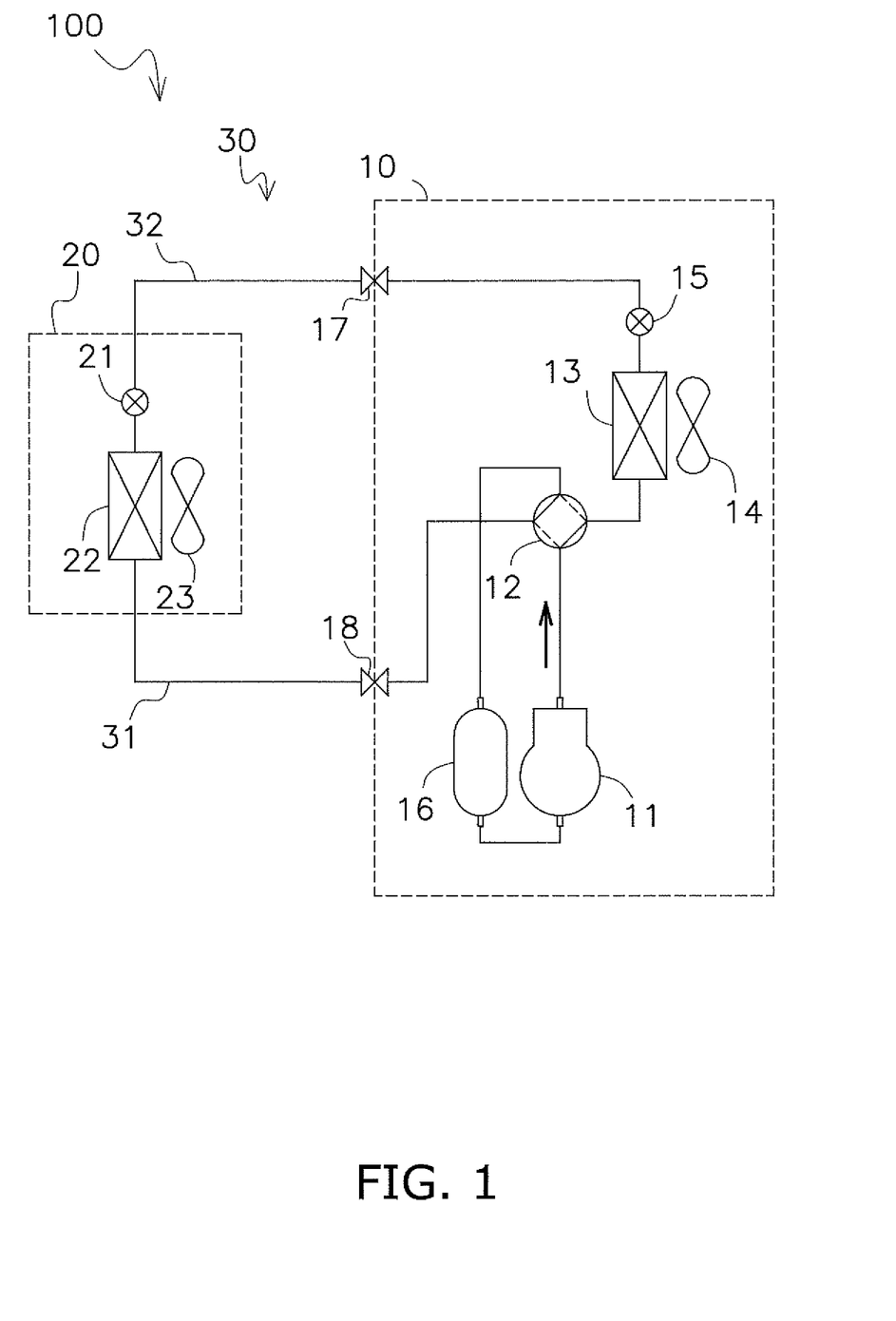
FIG. 1 is a schematic diagram showing an air conditioning apparatus 100 that is a target of maintenance work.

FIG. 1 shows an air conditioning apparatus 100 that is a target of maintenance work. A refrigerant circuit of the air conditioning apparatus 100 has an outdoor unit 10, an indoor unit 20, refrigerant communication piping 30, and refrigerant. The air conditioning apparatus 100 is for regulating the temperature of the air in the location where the indoor unit 20 is installed.

(1-1) Outdoor Unit 10

The outdoor unit 10 is for generating cold or heat. The outdoor unit 10 has a compressor 11, a four-port switching valve 12, an outdoor heat exchanger 13, an outdoor fan 14, an outdoor expansion valve 15, an accumulator 16, an outdoor liquid passage port 17, and an outdoor gas passage port 18.

(1-1-1) Compressor 11

The compressor 11 sucks in low-pressure gas refrigerant, compresses the low-pressure gas refrigerant to high-pressure gas refrigerant, and discharges the high-pressure gas refrigerant in the direction of the arrow.

(1-1-2) Four-port Switching Valve 12

The four-port switching valve 12 switches between a cooling operation and a heating operation. In the cooling operation the four-port switching valve 12 configures a refrigerant path indicated by the solid lines, and in the heating operation the four-port switching valve 12 configures a refrigerant path indicated by the dashed lines.

(1-1-3) Outdoor Heat Exchanger 13

The outdoor heat exchanger 13 performs heat exchange between the refrigerant and the air around the outdoor unit 10. In the case of the cooling operation, the outdoor heat exchanger 13 functions as a condenser and releases the heat of the refrigerant into the air. In the case of the heating operation, the outdoor heat exchanger 13 functions as an evaporator and takes the heat of the air into the refrigerant.

(1-1-4) Outdoor Fan 14

The outdoor fan 14 promotes the heat exchange performed by the outdoor heat exchanger 13.

(1-1-5) Outdoor Expansion Valve 15

The outdoor expansion valve 15 is a valve whose opening degree can be adjusted, and the outdoor expansion valve 15 functions as a device that reduces the pressure of the gas refrigerant.

(1-1-6) Accumulator 16

The accumulator 16 is for accumulating liquid refrigerant that has not evaporated in a stage prior to the compressor 11 and for allowing gas refrigerant to travel through.

(1-1-7) Outdoor Liquid Passage Port 17

The outdoor liquid passage port 17 is for connecting a liquid refrigerant pipe 31. The outdoor liquid passage port 17 has a built-in valve for manually closing the path along which mainly liquid refrigerant flows in a case where, for example, there is no plan to use the air conditioning apparatus 100 for a long period of time.

(1-1-8) Outdoor Gas Passage Port 18

The outdoor gas passage port 18 is for connecting a gas refrigerant pipe 32. The outdoor gas passage port 18 has a built-in valve for manually closing the path along which mainly gas refrigerant flows in a case where, for example, there is no plan to use the air conditioning apparatus 100 for a long period of time.

(1-2) Indoor Unit 20

The indoor unit 20 is for utilizing, for the convenience of the user, the heat or cold generated by the outdoor unit 10. The indoor unit 20 has an indoor expansion valve 21, a utilization unit heat exchanger 22, and an indoor fan 23.

(1-2-1) Indoor Expansion Valve 21

The indoor expansion valve 21 is a valve whose opening degree can be adjusted, and the indoor expansion valve 21 functions as a device that reduces the pressure of the gas refrigerant. The indoor expansion valve 21 is connected to the later-described liquid refrigerant pipe 31.

(1-2-2) Utilization Unit Heat Exchanger 22

The utilization unit heat exchanger 22 performs heat exchange between the refrigerant and the air around the indoor unit 20. The utilization unit heat exchanger 22 is connected to the later-described gas refrigerant pipe 32. In the case of the cooling operation, the utilization unit heat exchanger 22 functions as an evaporator and takes the heat of the air into the refrigerant. In the case of the heating operation, the utilization unit heat exchanger 22 functions as a condenser and releases the heat of the refrigerant into the air.

(1-2-3) Indoor Fan 23

The indoor fan 23 promotes the heat exchange performed by the utilization unit heat exchanger 22.

(1-2-4) Indoor Liquid Passage Port 27

An indoor liquid passage port 27 is for connecting the liquid refrigerant pipe 31. The indoor liquid passage port 27 has a built-in valve for manually closing the path along which mainly liquid refrigerant flows in a case where, for example, there is no plan to use the air conditioning apparatus 100 for a long period of time.

(1-2-5) Indoor Gas Passage Port 28

An indoor gas passage port 28 is for connecting the gas refrigerant pipe 32. The indoor gas passage port 28 has a built-in valve for manually closing the path along which mainly gas refrigerant flows in a case where, for example, there is no plan to use the air conditioning apparatus 100 for a long period of time.

(1-3) Refrigerant Communication Piping 30

The refrigerant communication piping 30 is for interconnecting the outdoor unit 10 and the indoor unit 20 to configure the refrigerant circuit. The refrigerant communication piping 30 has the liquid refrigerant pipe 31 and the gas refrigerant pipe 32. The liquid refrigerant pipe 31 connects the indoor expansion valve 21 to the outdoor liquid passage port 17. The gas refrigerant pipe 32 connects the utilization unit heat exchanger 22 to the outdoor gas passage port 18.

(1-4) Refrigerant

The refrigerant circulates in the heat source unit 10, the utilization unit 20, and the refrigerant communication piping 30. The refrigerant includes a compound represented by a molecular formula having one or more carbon-carbon unsaturated bonds. The refrigerant is, for example, a hydrofluoroolefin (HFO). HFOs are easily decomposed by OH radicals in the atmosphere, so they have a low global warming potential. Examples of HFOs include 1,1,2-trifluoroethylene (HFO-1123) and 2,3,3,3-tetrafluoropropene (HFO-1234yf).

(1-5) Operation of Air Conditioning Apparatus 100

(1-5-1) Cooling Operation

In the cooling operation, the four-port switching valve 12 configures a refrigerant path indicated by the solid lines in FIG. 1. The compressor 11 discharges high-pressure gas refrigerant in the direction of the arrow in FIG. 1. The high-pressure gas refrigerant travels through the four-port switching valve 12 and reaches the outdoor heat exchanger 13. The outdoor heat exchanger 13 functions as a condenser and condenses the high-pressure gas refrigerant into high-pressure liquid refrigerant. The high-pressure liquid refrigerant is reduced in pressure in the outdoor expansion valve 15, the liquid refrigerant pipe 31, and the indoor expansion valve 21, becomes gas-liquid two-phase refrigerant, and reaches the utilization unit heat exchanger 22. The utilization unit heat exchanger 22 functions as an evaporator and, in the process of evaporating the gas-liquid two-phase refrigerant into low-pressure gas refrigerant, absorbs heat from the surrounding air, whereby the surrounding air is cooled. The low-pressure gas refrigerant travels through the gas refrigerant pipe 32 and then the four-port switching valve 12 and thereafter is sucked into the compressor 11 via the accumulator 16.

(1-5-2) Heating Operation

In the heating operation, the four-port switching valve 12 configures a refrigerant path indicated by the dashed lines in FIG. 1. The compressor 11 discharges high-pressure gas refrigerant in the direction of the arrow in FIG. 1. The high-pressure gas refrigerant travels through the four-port switching valve 12 and then the gas refrigerant pipe 32 and thereafter reaches the utilization unit heat exchanger 22. The utilization unit heat exchanger 22 functions as a condenser and, in the process of condensing the high-pressure gas refrigerant into high-pressure liquid refrigerant, releases heat and warms the surrounding air. The high-pressure liquid refrigerant is reduced in pressure in the indoor expansion valve 21, the liquid refrigerant pipe 31, and the outdoor expansion valve 15, becomes gas-liquid two-phase refrigerant, and reaches the outdoor heat exchanger 13. The outdoor heat exchanger 13 functions as an evaporator and evaporates the gas-liquid two-phase refrigerant to low-pressure gas refrigerant. Thereafter, the low-pressure gas refrigerant travels through the four-port switching valve 12 and thereafter is sucked into the compressor 11 via the accumulator 16.

(2) Configuration of Refrigerant Recovery System 90A

Figure 2:
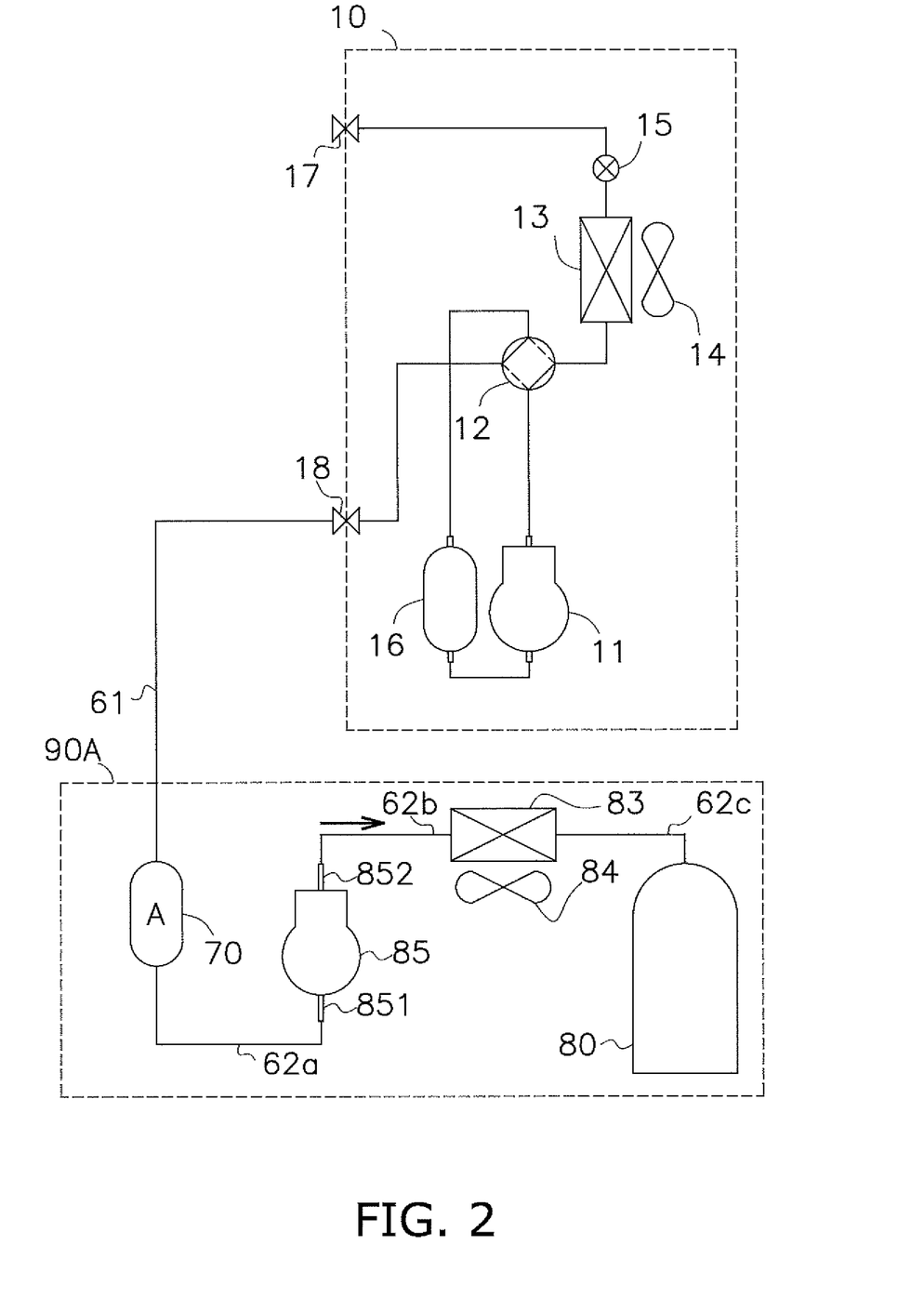
FIG. 2 is a schematic diagram showing a refrigerant recovery system 90A pertaining to a first embodiment of the invention.

FIG. 2 shows, in conjunction with the air conditioning apparatus 100, a refrigerant recovery system 90A pertaining to a first embodiment of the invention. In the same drawing, the refrigerant communication piping 30 of the air conditioning apparatus 100 is removed, whereby the indoor unit is separated from the outdoor unit 10. The refrigerant recovery system 90A is connected to the outdoor unit 10 in order to recover the refrigerant from the outdoor unit 10.

The refrigerant recovery system 90A has an extraction pipe 61, a stabilizer holding container 70, recovery pipes 62a to 62c, a recovery container 80, a recovery device 85, a recovery system heat exchanger 83, and a recovery system fan 84.

(2-1) Extraction Pipe 61

The extraction pipe 61 is for extracting gas refrigerant from the outdoor unit 10 and, when using the refrigerant recovery system 90A, is connected to the outdoor gas passage port 18 of the outdoor unit 10.

(2-2) Stabilizer Holding Container 70

The stabilizer holding container 70 is connected to an end portion of the extraction pipe 61. The stabilizer holding container 70 holds a stabilizer A inside. The content of the stabilizer A will be described later.

(2-3) Recovery Pipes 62a to 62b

The recovery pipe 62a connects the stabilizer holding container 70 to the recovery device 85. The recovery pipe 62b connects the recovery device 85 to the recovery system heat exchanger 83. The recovery pipe 62c connects the recovery system heat exchanger 83 to the recovery container 80.

(2-4) Recovery Device 85

The recovery device 85 is for generating suction for recovering the gas refrigerant and includes, for example, a compressor. The recovery device 85 has a suction port 851 and a discharge port 852.

(2-5) Recovery System Heat Exchanger 83

The recovery system heat exchanger 83 is for condensing, into liquid refrigerant by heat exchange with air, the high-pressure gas refrigerant discharged from the discharge port 852 of the recovery device 85.

(2-6) Recovery System Fan 84

The recovery system fan 84 promotes the heat exchange performed by the recovery system heat exchanger 83.

(2-7) Recovery Container 80

The recovery container 80 is for recovering and holding the liquid refrigerant discharged from the recovery system heat exchanger 83.

(3) Operation

In the refrigerant recovery, the refrigerant is caused, by the suction generated by the recovery device 85, to move in a direction in which it sequentially goes through the outdoor gas passage port 18, the stabilizer holding container 70, the recovery system heat exchanger 83, and the recovery container 80.

The gas refrigerant is guided from the outdoor gas passage port 18 of the outdoor unit 10 via the extraction pipe 61 to the stabilizer holding container 70. In the stabilizer holding container 70, the refrigerant comes into contact with the stabilizer A. Because of this, free radicals in the refrigerant, which can cause a disproportionation reaction of the refrigerant to continue, are acted upon by the stabilizer A so that the occurrence or progression of a disproportionation reaction is suppressed. Thereafter, the refrigerant is sucked by the suction through the recovery pipe 62a into the suction port 851 of the recovery device 85 and is discharged from the discharge port 852. Then, the gas refrigerant undergoes heat exchange with air in the recovery system heat exchanger 83, is condensed, and becomes liquid refrigerant. The liquid refrigerant is carried through the recovery pipe 62c to the recovery container 80 and is held there.

The refrigerant held in the recovery container 80 is returned to the outdoor unit 10 again when doing so becomes necessary. At this time, a disproportionation reaction of the refrigerant to be returned is suppressed.

(4) Content of Stabilizer A

The stabilizer A includes at least one of an oxidation resistance improver, a heat resistance improver, and a metal deactivator.

The oxidation resistance improver and the heat resistance improver include at least one of the substances listed below.

Oxidation Resistance Improver, Heat Resistance Improver

N,N'-diphenylphenylenediamine, p-octyldiphenylamine, p,p'-dioctyldiphenylamine, N-phenyl-1-naphthylamine. N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol, 4,4'-methylenebis(2,6-di-t-butylphenol).

The metal deactivator includes at least one of the substances listed below.

Metal Deactivator

Imidazole, benzimidazole, 2-mercaptobenzothiazole, 2,5-dimercaptothiadiazole, salicylidene-propylenediamine, pyrazole, benzotriazole, tolutriazole, 2-methylbenzimidazole, 3,5-dimethylpyrazole, methylenebis-benzotriazole, organic acids or esters thereof, primary, secondary, or tertiary aliphatic amines, amine salts of organic acids or inorganic acids, heterocyclic nitrogen-containing compounds, amine salts of alkyl acid phosphates or derivatives thereof.

(5) Characteristics

5-1

The refrigerant extracted from the extraction pipe 61 comes into contact with the stabilizer A in the stabilizer holding container 70. Consequently, the occurrence of a disproportionation reaction of the refrigerant is suppressed.

5-2

This application has presented various findings as the composition of the stabilizer A. Namely, the stabilizer A may include at least one of an oxidation resistance improver, a heat resistance improver, and a metal deactivator. In addition, possible compositions of oxidation resistance improvers, heat resistance improvers, metal deactivators, antioxidants, and deoxidizers are listed in section (4) of this specification. According to these findings, specific compositions of the stabilizer A are presented, and the manufacture and preparation thereof becomes possible.

Second Embodiment (1) Configuration of Refrigerant Recovery System 90B

Figure 3:
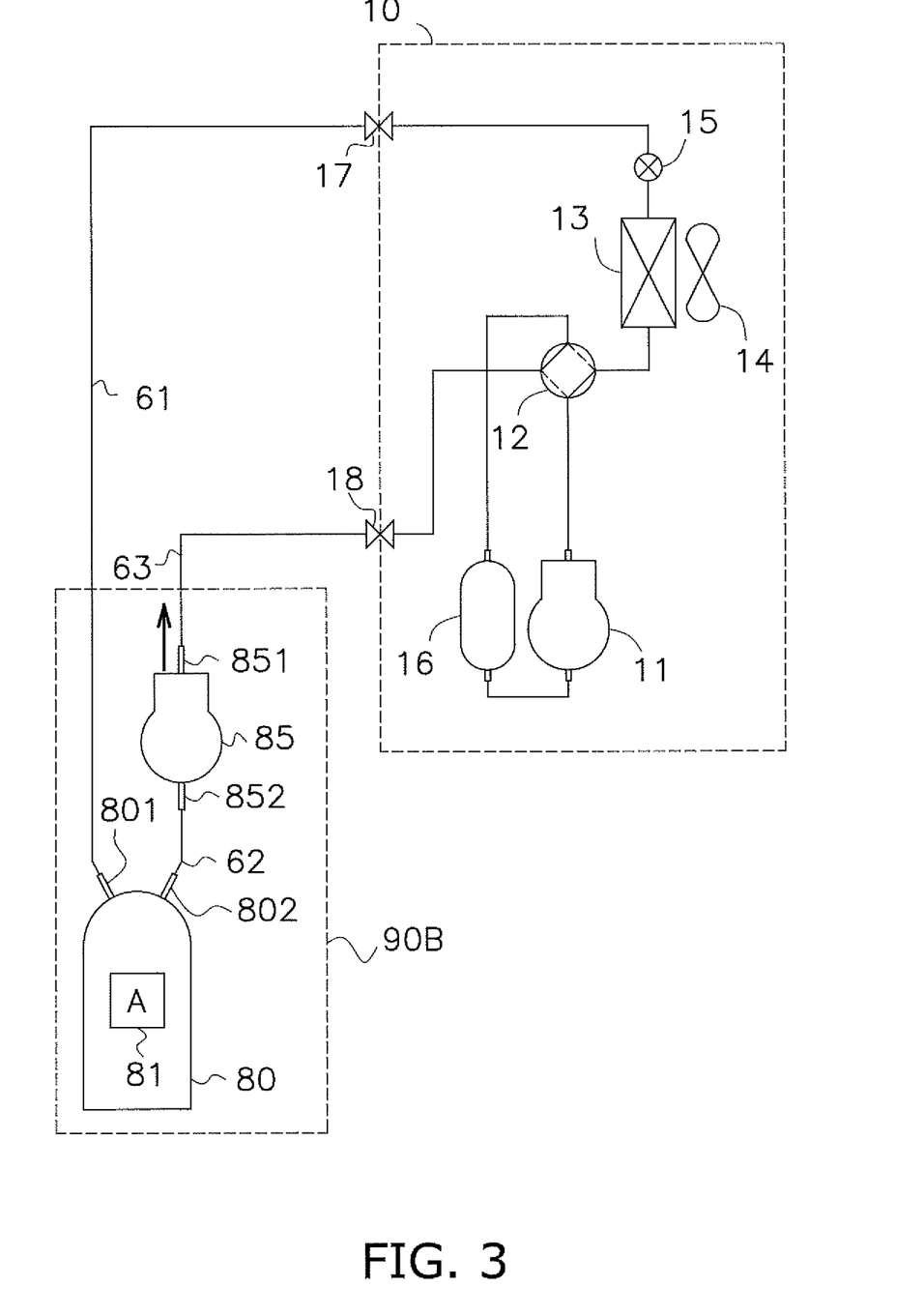
FIG. 3 is a schematic diagram showing a refrigerant recovery system 90B pertaining to a second embodiment of the invention

FIG. 3 shows a refrigerant recovery system 90B pertaining to a second embodiment of the invention. The target of the maintenance work of the refrigerant recovery system 90B is, as in the first embodiment, the air conditioning apparatus 100 shown in FIG. 1. In FIG. 3, the outdoor unit 10 is separated from other elements and is connected to the refrigerant recovery system 90B.

The refrigerant recovery system 90B has an extraction pipe 61, a recovery container 80, a recovery pipe 62, a recovery device 85, and a return pipe 63.

(1-1) Extraction Pipe 61

The extraction pipe 61 is for extracting liquid refrigerant from the outdoor unit 10 and, when using the refrigerant recovery system 90B, is connected to the outdoor liquid passage port 17 of the outdoor unit 10.

(1-2) Recovery Container 80

The recovery container 80 is for recovering and holding the liquid refrigerant discharged from the extraction pipe 61. The recovery container 80 has a stabilizer holding component 81 inside. The stabilizer holding component 81 holds a stabilizer A. The content of the stabilizer A is the same as in the first embodiment. The recovery container 80 has a liquid recovery port 801 and a gas discharge port 802.

(1-3) Recovery Pipe 62

The recovery pipe 62 is for guiding the gas refrigerant and connects the recovery container 80 to the recovery device 85.

(1-4) Recovery Device 85

The recovery device 85 is for generating suction for recovering the refrigerant and includes, for example, a compressor. The recovery device 85 has a suction port 851 and a discharge port 852. The suction port 851 is for sucking in the gas refrigerant and is connected to the gas discharge port 802.

(1-5) Return Pipe 63

The return pipe 63 is for returning the gas refrigerant to the outdoor unit 10 and connects the discharge port 852 to the outdoor gas passage port 18.

(2) Characteristics

The refrigerant sucked out from the outdoor liquid passage port 17 of the outdoor unit 10 comes into contact with the stabilizer A in the recovery container 80. Because of this, free radicals in the refrigerant that can cause a disproportionation reaction of the refrigerant to continue are acted upon by the stabilizer A so that the occurrence or progression of a disproportionation reaction is suppressed.

The refrigerant stored in the recovery container 80 is returned to the outdoor unit 10 again when it becomes necessary to do so. At this time, a disproportionation reaction of the refrigerant to be returned is suppressed.

According to this configuration, the refrigerant extracted from the extraction pipe 61 comes into contact with the stabilizer A in the recovery container 80. Consequently, the occurrence of a disproportionation reaction of the refrigerant is suppressed.

REFERENCE SIGNS LIST

61 Extraction Pipe
62, 62a to 62c Recovery Pipes
70 Stabilizer Holding Container
80 Recovery Container
81 Stabilizer Holding Component
83 Recovery System Heat Exchanger
84 Recovery System Fan
85 Recovery Device
90A, 90B Recovery Systems
100 Air Conditioning Apparatus
A Stabilizer

CITATION LIST

Patent Literature

Patent Document 1: JP-A No. 2005-249297

The invention claimed is:

1. A refrigerant recovery system comprising:
an extraction pipe that is connectable to a refrigerant extraction port of an air conditioning apparatus that has refrigerant, the extraction pipe being configured to guide gaseous refrigerant;
a stabilizer holding container that is connected to the extraction pipe, holds a stabilizer, and causes the gaseous refrigerant from the extraction pipe to directly come into contact with the stabilizer;
a recovery pipe that guides the refrigerant discharged from the stabilizer holding container, the stabilizer suppressing a disproportionation reaction of the refrigerant;
a recovery container that is connected to the recovery pipe and recovers the refrigerant guided by the recovery pipe; and
a recovery device including a compressor, wherein the compressor causes the refrigerant to move from the refrigerant extraction port to the recovery container,
wherein the refrigerant includes a compound represented by a molecular formula having one or more carbon-carbon unsaturated bonds.

2. The refrigerant recovery system according to claim 1, wherein
the stabilizer includes at least one of an oxidation resistance improver, a heat resistance improver, and a metal deactivator,
the oxidation resistance improver and the heat resistance improver include at least one of
N,N'-diphenylphenylenediamine,
p-octyldiphenylamine,
p,p'-dioctyldiphenylamine,
N-phenyl-1-naphthylamine,
N-phenyl-2-naphthylamine,
N-(p-dodecyl)phenyl-2-naphthylamine,
di-1-naphthylamine,
di-2-naphthylamine, N-alkylphenothiazine,
6-(t-butyl)phenol,
2,6-di-(t-butyl)phenol,
4-methyl-2,6-di-(t-butyl)phenol,
4,4'-methylenebis(2,6-di-t-butylphenol), and
the metal deactivator includes at least one of
imidazole,
benzimidazole,
2-mercaptobenzothiazole,
2,5-dimercaptothiadiazole,
salicylidene-propylenediamine,
pyrazole,
benzotriazole,
tolutriazole,
2-methylbenzimidazole,
3,5-dimethylpyrazole,
methylenebis-benzotriazole,
organic acids or esters thereof,
primary, secondary, or tertiary aliphatic amines,
amine salts of organic acids or inorganic acids,
heterocyclic nitrogen-containing compounds, and
amine salts of alkyl acid phosphates or derivatives thereof.

3. The refrigerant recovery system according to claim 1, wherein the stabilizer holding container is directly and mechanically connected to the extraction pipe.

4. A refrigerant recovery system comprising:
an extraction pipe that is connectable to a refrigerant extraction port of an air conditioning apparatus that has refrigerant;
a recovery container that is connected to the extraction pipe, has a stabilizer holding component that holds a stabilizer and causes the refrigerant from the extraction pipe to directly come into contact with the stabilizer, the recovery container further having a liquid recovery port and a gas discharge port, the stabilizer suppressing a disproportionation reaction of the refrigerant; and
a recovery device including a compressor, wherein the compressor causes the refrigerant to move from the refrigerant extraction port to the recovery container,
wherein the refrigerant includes a compound represented by a molecular formula having one or more carbon-carbon unsaturated bonds.

5. The refrigerant recovery system according to claim 4, wherein
the stabilizer includes at least one of an oxidation resistance improver, a heat resistance improver, and a metal deactivator,
the oxidation resistance improver and the heat resistance improver include at least one of
N,N'-diphenylphenylenediamine,
p-octyldiphenylamine,
p,p'-dioctyldiphenylamine,
N-phenyl-1-naphthylamine,
N-phenyl-2-naphthylamine,
N-(p-dodecyl)phenyl-2-naphthylamine,
di-1-naphthylamine,
di-2-naphthylamine,
N-alkylphenothiazine,
6-(t-butyl)phenol,
2,6-di-(t-butyl)phenol,
4-methyl-2,6-di-(t-butyl)phenol,
4,4'-methylenebis(2,6-di-t-butylphenol), and
the metal deactivator includes at least one of
imidazole,
benzimidazole,
2-mercaptobenzothiazole,
2,5-dimercaptothiadiazole,
salicylidene-propylenediamine,
pyrazole,
benzotriazole,
tolutriazole,
2-methylbenzimidazole,
3,5-dimethylpyrazole,
methylenebis-benzotriazole,
organic acids or esters thereof,
primary, secondary, or tertiary aliphatic amines,
amine salts of organic acids or inorganic acids,
heterocyclic nitrogen-containing compounds, and
amine salts of alkyl acid phosphates or derivatives thereof.

6. A refrigerant recovery method comprising:
guiding gaseous refrigerant via an extraction pipe from a refrigerant circuit a stabilizer holding container;
causing the gaseous refrigerant discharged from the extraction pipe to come into direct contact with a stabilizer in the stabilizer holding container, the stabilizer suppressing a disproportionation reaction of the refrigerant;
guiding the refrigerant discharged from the stabilizer holding container to a recovery container via a recovery pipe; and
holding the refrigerant in the recovery container,
wherein a compressor causes the refrigerant to move from the extraction pipe to the recovery container.

7. The refrigerant recovery method according to claim 6, wherein
the stabilizer includes at least one of an oxidation resistance improver, a heat resistance improver, and a metal deactivator,
the oxidation resistance improver and the heat resistance improver include at least one of
N,N'-diphenylphenylenediamine,
p-octyldiphenylamine,
p,p'-dioctyldiphenylamine,
N-phenyl-1-naphthylamine,
N-phenyl-2-naphthylamine,
N-(p-dodecyl)phenyl-2-naphthylamine,
di-1-naphthylamine,
di-2-naphthylamine,
N-alkylphenothiazine,
6-(t-butyl)phenol,
2,6-di-(t-butyl)phenol,
4-methyl-2,6-di-(t-butyl)phenol, and
4,4'-methylenebis(2,6-di-t-butylphenol), and
the metal deactivator includes at least one of
imidazole,
benzimidazole,
2-mercaptobenzothiazole,
2,5-dimercaptothiadiazole,
salicylidene-propylenediamine,
pyrazole,
benzotriazole,
tolutriazole,
2-methylbenzimidazole,
3,5-dimethylpyrazole,
methylenebis-benzotriazole,
organic acids or esters thereof,
primary, secondary, or tertiary aliphatic amines,
amine salts of organic acids or inorganic acids,
heterocyclic nitrogen-containing compounds, and amine salts of alkyl acid phosphates or derivatives thereof.

* * * * *